(12) United States Patent
Sugitani et al.

(10) Patent No.: US 9,215,011 B2
(45) Date of Patent: Dec. 15, 2015

(54) OPTICAL RECEIVER AND OPTICAL RECEIVING METHOD

(71) Applicant: FUJITSU LIMITED, Kawasaki-shi, Kanagawa (JP)

(72) Inventors: Kiichi Sugitani, Fukuoka (JP); Kazunari Shiota, Kasuga (JP); Eri Katayama, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/507,032

(22) Filed: Oct. 6, 2014

(65) Prior Publication Data

US 2015/0125150 A1 May 7, 2015

(30) Foreign Application Priority Data

Nov. 6, 2013 (JP) .................................. 2013-230726

(51) Int. Cl.
*H04B 10/61* (2013.01)
*H04B 10/69* (2013.01)
(Continued)

(52) U.S. Cl.
CPC .......... *H04B 10/614* (2013.01); *H04B 10/6971* (2013.01)

(58) Field of Classification Search
CPC ............. H04B 10/614; H04B 10/6164; H04B 10/2507; H04B 10/25073; H04B 10/6165; H04B 10/6971; H04B 2210/25
USPC ........... 398/65, 158, 159, 149, 205, 206, 208, 398/209
See application file for complete search history.

(56) References Cited

U.S. PATENT DOCUMENTS

| 8,233,809 | B2 * | 7/2012 | Qian | .................. H04B 10/2513 398/202 |
| 8,335,438 | B2 * | 12/2012 | Kim | ....................... H04B 10/60 398/154 |

(Continued)

FOREIGN PATENT DOCUMENTS

| JP | 2002-261692 | 9/2002 |
| JP | 2008-10971 | 1/2008 |

(Continued)

OTHER PUBLICATIONS

Leven et al., "Frequency Estimation in Intradyne Reception", *IEEE Photonics Technology Letter*, Mar. 15, 2007, pp. 366-368, vol. 19, No. 6.

(Continued)

*Primary Examiner* — Dalzid Singh
(74) *Attorney, Agent, or Firm* — Staas & Halsey LLP

(57) ABSTRACT

An optical receiver, includes: a signal processor to perform digital signal processing on a polarization demultiplexed signal obtained by demultiplexing a polarization multiplexed signal corresponding to a reception signal, the signal processor includes: an adaptive equalization circuit to compensate for the polarization demultiplexed signal by control of a filter coefficient; a first frequency offset estimation circuit to receive a first polarization demultiplexed signal diverged at a preceding stage and estimate a first frequency offset; a second frequency offset estimation circuit to receive a second polarization demultiplexed signal diverged at a succeeding stage and estimate a second frequency offset; and a decision circuit to decide whether the filter coefficient is correct based on a first difference between the first frequency offset and the second frequency offset and output, when deciding that the filter coefficient is incorrect, a first trigger for re-calculation of the filter coefficient.

17 Claims, 11 Drawing Sheets

(51) Int. Cl.
*H04B 10/67* (2013.01)
*H04B 10/2507* (2013.01)

(56) References Cited

U.S. PATENT DOCUMENTS

| | | | | |
|---|---|---|---|---|
| 9,014,574 | B2* | 4/2015 | Arikawa | H04B 10/614 398/205 |
| 2002/0123851 | A1* | 9/2002 | Kurooka | H04B 10/2513 702/69 |
| 2007/0297804 | A1 | 12/2007 | Honda et al. | |
| 2009/0142076 | A1* | 6/2009 | Li | H04B 10/61 398/208 |
| 2010/0003028 | A1* | 1/2010 | Zhang | H04B 10/61 398/65 |
| 2010/0329697 | A1* | 12/2010 | Koizumi | H03J 7/26 398/208 |
| 2011/0243575 | A1* | 10/2011 | Yan | H04L 25/0305 398/205 |
| 2012/0128377 | A1* | 5/2012 | Hatae | H04B 10/616 398/208 |
| 2013/0308960 | A1* | 11/2013 | Horikoshi | H03H 21/0012 398/209 |

FOREIGN PATENT DOCUMENTS

| | | |
|---|---|---|
| JP | 2010-268390 | 11/2010 |
| JP | 2011-211706 | 10/2011 |

OTHER PUBLICATIONS

Tao et al., "Simple, Robust, and Wide-Range Frequency Offset Monitor for Automatic Frequency Control in Digital Coherent Receivers", *33rd European Conference and Exhibition on Optical Communication (ECOC)*, Sep. 2007, 2 pp.

Nakashima et al., "Novel Wide-range Frequency Offset Compensator Demonstrated with Real-time Digital Coherent Receiver", *34th European Conference and Exhibition on Optical Communication (ECOC2008)*, Mo.3.D.4, Sep. 21-25, 2008, 2 pp.

Johnson, Jr. et al., "Blind Equalization Using the Constant Modulus Criterion: A Review", *Proceedings of the IEEE*, Oct. 1998, pp. 1927-1950, vol. 86, No. 10.

Nakagawa et al., "Wide-Range and Fast-Tracking Frequency Offset Estimator for Optical Coherent Receivers", *European Conference on Optical Communications (ECOC2010)*, We.7.A.2, Sep. 19-23, 2010, 3 pp.

* cited by examiner

OPTICAL RECEIVER AND OPTICAL RECEIVING METHOD

CROSS-REFERENCE TO RELATED APPLICATION

This application is based upon and claims the benefit of priority from the prior Japanese Patent Application No. 2013-230726 filed on Nov. 6, 2013, the entire contents of which are incorporated herein by reference.

FIELD

The embodiments discussed herein are related to an optical receiver and an optical receiving method for use with an optical transmission system.

BACKGROUND

In recent years, introduction of coherent optical communication using a digital signal processing technology has been and is progressing. In the coherent optical communication, the transmission rate has been raised in order to increase the transmission amount. However, in proportion to the rise of the transmission rate, waveform distortion occurs and deteriorates the transmission quality. Therefore, a technology is available by which orthogonally polarized waves of an H (Horizontal) polarized wave and a V (Vertical) polarized wave of a transmission signal (optical signal) of a transmitter are multiplexed. By the polarization multiplexing, the transmission rate per one polarized wave can be decreased to implement high speed communication.

A transmission signal (polarization multiplexed signal) having passed through a transmission line is demultiplexed into two orthogonally polarized wave components by a polarization demultiplexing circuit provided at an input terminal of a reception unit of a receiver (digital coherent receiver). The reception signal after demultiplexed successively passes several units for separation of I and Q components, photoelectric conversion and analog to digital conversion and then is inputted as a quantized digital signal to a signal processing circuit.

Since the polarization multiplexed signal is influenced by polarized wave rotation, polarization mode dispersion (PMD) and so forth in the transmission line, where only the polarization demultiplexing circuit is used, it is difficult to fully demultiplex a polarized wave. A process for polarization demultiplexing is performed by an adaptive equalization circuit provided in the signal processing circuit.

The adaptive equalization circuit is configured, for example, using a butterfly type finite impulse response (FIR) filter where a plurality of filters are coupled in a crossed coupling form. For compensation only for polarization demultiplexing, a plurality of filters for use in a butterfly type FIR filter can be configured by one tap. In contrast, in a case where equalization in regard to linear deterioration such as PMD, wavelength dispersion or the like is also compensated, a complex digital FIR filter having a plurality of taps is used for each filter. The tap number assumes various values from several to several tens taps depending upon the range of the compensation. As an algorithm for optimally controlling the coefficient of each filer, a constant modulus algorithm (CMA) method and other algorithms have been proposed (refer to, for example, C. Richard Johnson and five others, "Blind Equalization Using the Constant Modulus Criterion: A Review," *Proceedings of the IEEE*, vol. 86, No. 10, October 1998, hereinafter referred to as Non-Patent Document 1).

At a succeeding stage to the adaptive equalization circuit in the signal processing circuit, a frequency offset compensation circuit is provided which compensates for a frequency offset (difference between an optical reception frequency and a frequency of local oscillation light) of the receiver. As regards the frequency offset compensation circuit, for example, a technology has been disclosed which removes coded components and noise components from complex electric field information by raising a phase-shift keying (PSK) signal of m values to the m-th power to extract a component of a frequency offset (refer to, for example, Andreas Leven and three others, "Frequency Estimation in Intradyne Reception," *IEEE Photonics Technology Letters*, vol. 19, No. 6, pp. 366-368, March 2007, hereinafter referred to as Non-Patent Document 2). Further, a technology is disclosed wherein provisional decision of a signal is performed, removes coded components by subtracting a result of the provisional decision and expands an estimation range of a frequency offset (refer to, for example, Hisao Nakashima and ten others, "Novel Wide-range Frequency Offset Compensator Demonstrated with Real-time Digital Coherent Receiver," *34th European Conference and Exhibition on Optical Communication* (ECOC2008), Mo. 3, D. 4, September 2008, hereinafter referred to as Non-Patent Document 3).

Further, a technology is available wherein a difference between an current output and a previous output of an FIR filter for a PSK signal is calculated to update an equalization coefficient (refer to, for example, Japanese Laid-open Patent Publication No. 2011-211706). Another technology is available wherein a frequency offset is monitored and calculation of a coefficient of an equalizer for wavelength dispersion compensation is performed until the frequency offset becomes equal to or lower than a given value (refer to, for example, Japanese Laid-open Patent Publication No. 2010-268390). A further technology is available wherein a compensation characteristic is controlled so that a frequency difference between frequency data of a signal that has undergone wavelength deterioration of a transmission line and frequency data of a reference waveform having no wavelength deterioration is minimized (refer to, for example, Japanese Laid-open Patent Publication 2002-261692). A still further technology is available wherein a dispersion compensation amount is adjusted so that a frequency difference between a clock of a reproduced optical signal and a clock given in advance is reduced (refer to, for example, Japanese Laid-open Patent Publication NO. 2008-19071).

SUMMARY

According to an aspect of the embodiments, an optical receiver, includes: a signal processor configured to perform digital signal processing on a polarization demultiplexed signal which is obtained by demultiplexing a polarization multiplexed signal corresponding to a reception signal, the signal processor includes: an adaptive equalization circuit configured to compensate for the polarization demultiplexed signal by control of a filter coefficient; a first frequency offset estimation circuit configured to receive a first polarization demultiplexed signal which is diverged at a preceding stage to the adaptive equalization circuit and estimate a first frequency offset of the first a polarization demultiplexed signal for each of polarized waves; a second frequency offset estimation circuit configured to receive a second polarization demultiplexed signal which is diverged at a succeeding stage to the adaptive equalization circuit and estimate a second frequency offset of the second polarization demultiplexed signal for each of the polarized waves; and a decision circuit configured to decide whether the filter coefficient is correct based on a first difference between the first frequency offset and the second frequency offset and output, when the decision circuit decides that the filter coefficient is incorrect, a first trigger for re-calculation of the filter coefficient to the adaptive equalization circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The optimization control of the filter coefficient of the adaptive equalization circuit sometimes fails in optimization control if an error arises from such a factor as the electric power of an input signal to the adaptive quantization circuit, a magnitude of an adjustment coefficient, an initial value of the coefficient, a signal quality and so forth.

A reception signal processing circuit that is provided at a succeeding stage to a reception unit and processes an output of a digital signal decides whether or not the reception unit is in a correctly functioning state based on an error of data obtained by analysis of a packet. In the reception signal processing circuit, a certain period of processing time is required for various signal processes such as synchronization and analysis of a frame and calculation of an error rate after an output of the reception unit is received. Therefore, time is required until the reception signal processing circuit outputs a trigger for causing the adaptive equalization circuit of the reception unit to perform re-calculation of a correct filter coefficient. Further, time is required until the reception signal processing circuit specifies that the cause of an error of a packet is based on an error in optimization control of the filter coefficient of the adaptive equalization circuit.

Further, when the filter coefficient of the adaptive equalization circuit does not converge to a correct value by a single time calculation operation of the reception signal processing circuit, the reception signal processing circuit repeats the re-calculation over a plural number of times. Therefore, further time for the re-calculation is additionally required before the filter coefficient converges to the correct value.

Therefore, it is desirable to rapidly detect whether a filter coefficient for adaptive equalization is correct or incorrect.

Embodiment 1

Figure 1:
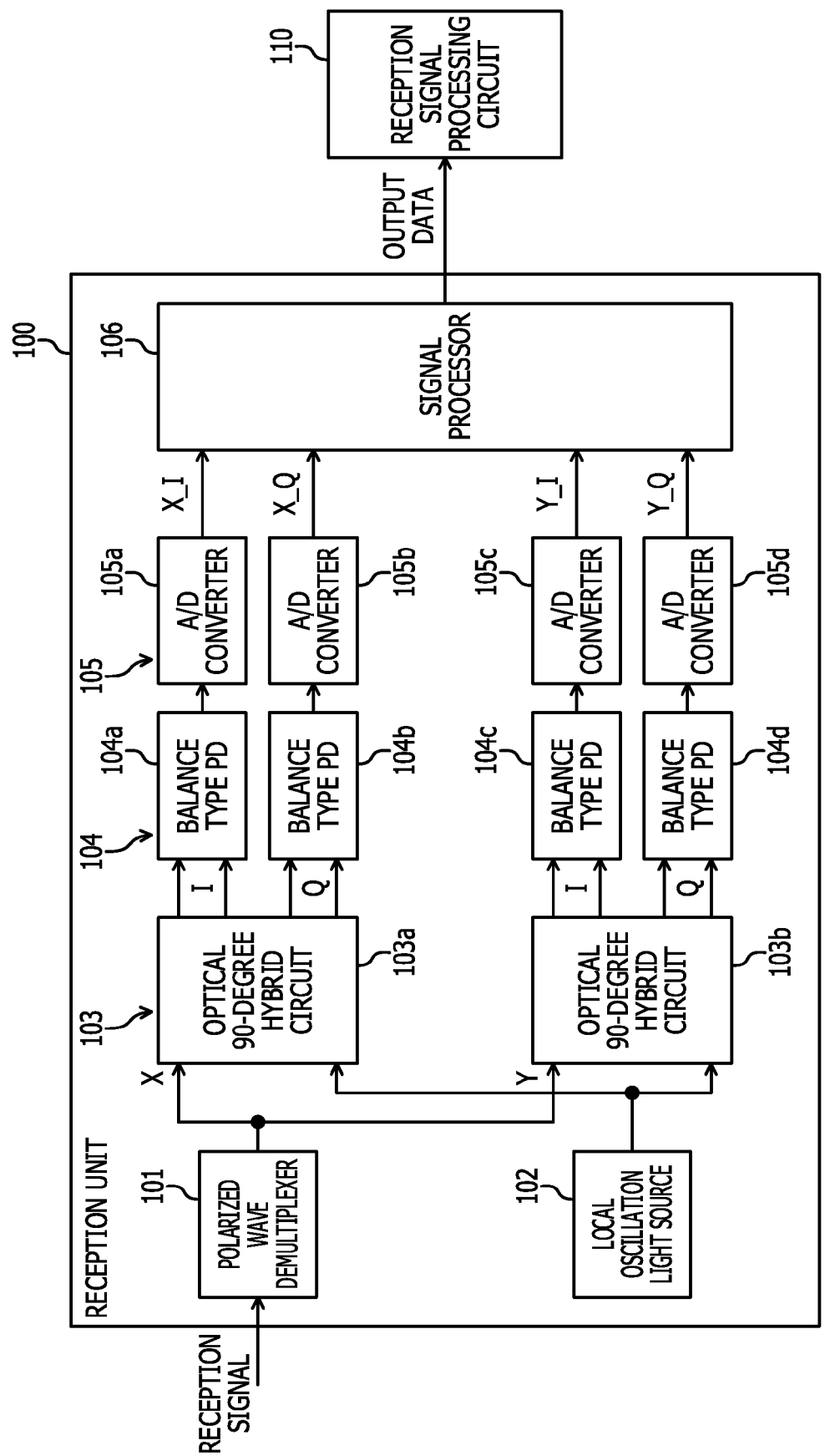
FIG. 1 is a block diagram depicting a entire configuration of an optical receiver according to an embodiment 1.

In the following, suitable embodiments of the technology disclosed herein are described in detail with reference to the accompanying drawings. FIG. 1 is a block diagram depicting a entire configuration of an optical receiver according to an embodiment 1.

The optical receiver includes a digital coherent reception unit (reception unit) 100 and a reception signal processing circuit 110 that processes a signal of output data of the reception unit 100.

In the reception unit 100, a reception signal (polarization multiplexed signal) input from a transmission line is input to a polarized wave demultiplexer 101. The polarized wave demultiplexer 101 demultiplexes the input reception signal into two orthogonally polarized wave components. The demultiplexed orthogonally polarized wave components X and Y are input to respective optical 90-degree hybrid circuits 103 (103a for an X polarized wave component and 103b for a Y polarized wave component). To the optical 90-degree hybrid circuits 103 (103a and 103b), orthogonal signals from a local oscillation light source 102 are input. The optical 90-degree hybrid circuits 103 mix the reception signals with the local oscillation signals to separate I and Q components.

The outputs (I and Q components) of the optical 90-degree hybrid circuits 103 (103a and 103b) are input to respective photoelectric conversion units 104 (104a to 104d) such as balance type photodiodes (PDs), are photoelectrically converted by the respective photoelectric conversion units 104 (104a to 104d) and then are subjected to respective analog-digital conversion by analog-to-digital (AD) converters 105 (105a to 105d). The AD converters 105a to 105d output I and Q components (X_I and X_Q) of the quantized X polarized waves and I and Q components (Y_I and Y_Q) of the quantized Y polarized waves to a signal processor 106.

The signal processor 106 may perform compensation for polarized waves that are not demultiplexed by the polarized wave demultiplexer 101 because of an influence of polarization rotation, PMD and so forth by digital signal processing. The compensation may be performed on the polarized waves that are not demultiplexed only by the polarized wave demultiplexer 101. The compensation may include compensation for PMD and wavelength dispersion in addition to polarization demultiplexing. The signal processor 106 includes the adaptive equalization circuit described hereinabove.

Output data output from the signal processor 106 of the reception unit 100 is input to the reception signal processing circuit 110. The reception signal processing circuit 110 performs various signal processes such as synchronization and analysis of a frame and calculation of an error rate for the digital output data of the reception unit 100.

The signal processor 106 may be configured from a field-programmable gate array (FPGA) for example, and the reception signal processing circuit 110 may be configured from a processor such as a digital signal processor (DSP).

Figure 2:
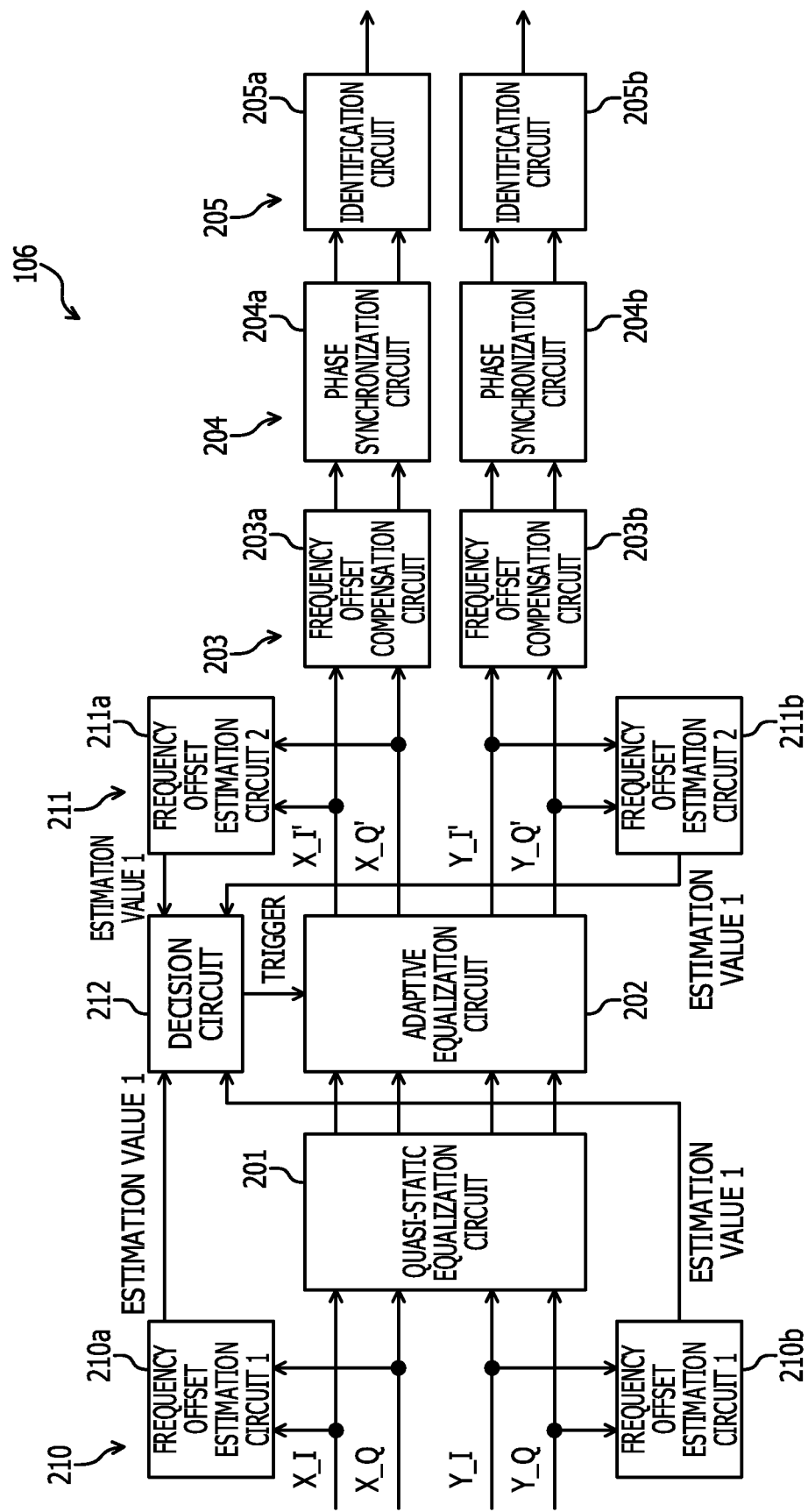
FIG. 2 is a block diagram depicting an internal configuration of a signal processor according to the embodiment 1.

FIG. 2 is a block diagram depicting an internal configuration of a signal processor according to the embodiment 1. The signal processor 106 in the reception unit 100 depicted in FIG. 1 is described. The signal processor 106 includes a quasi-static equalization circuit 201, an adaptive equalization circuit 202, a frequency offset compensation circuit 203, a phase synchronization circuit 204 and an identification circuit 205. The circuits from the frequency offset compensation circuit 203 to the identification circuit 205, as illustrated in FIG. 2, include frequency offset compensation circuits 203a and 203b to identification circuits 205a and 205b, respectively, for two orthogonally polarized wave components (X and Y).

The quasi-static equalization circuit 201 receives IQ components (X_I, X_Q, Y_I and Y_Q) of X and Y polarized waves and performs dispersion compensation for the IQ components. The adaptive equalization circuit 202 may be configured from butterfly type FIR filters described hereinabove or like circuits and may control the filter coefficient (coef) of the filters using the CMA method (refer to Non-Patent Document 1) or a like method so as to be optimized. By the optimization control, the quasi-static equalization circuit 201 may equally compensate for polarization demultiplexing, PMD, wavelength dispersion and so forth.

At a succeeding stage to the adaptive equalization circuit 202, the frequency offset compensation circuit 203 (203a and 203b) is provided which compensates for a frequency offset of the receiver (difference between the optical reception frequency and the frequency of the local oscillation light). At a succeeding stage to the frequency offset compensation circuit 203, the phase synchronization circuit 204 (204a and 204b) is provided which synchronizes the phases of the IQ components (X_I, X_Q, Y_I and Y_Q) of the X and Y polarized waves with one another. At a succeeding stage to the phase synchronization circuit 204, the identification circuit 205 (205a and 205b) is provided which identifies and reproduces data (reception signals) of the IQ components (X_I, X_Q, Y_I and Y_Q) of the X and Y polarized waves.

The signal processor 106 in the embodiment 1 further includes frequency offset estimation circuits 1 and 2 (first frequency offset estimation circuit 210 and second frequency offset estimation circuit 211), and a decision circuit 212. A first one (210a) of the first frequency offset estimation circuits 1 is provided at a stage preceding to the location of the adaptive equalization circuit 202 and receives IQ components (X_I and X_Q) of an X polarized wave diverging from a main signal line. Meanwhile, a second one (210b) of the frequency offset estimation circuits 1 is provided at a preceding stage to the location of the adaptive equalization circuit 202 similarly and receives IQ components (Y_I and Y_Q) of a Y polarized wave diverging from the main signal line.

On the other hand, the frequency offset estimation circuits 2 (211) are provided at a succeeding stage to the adaptive equalization circuit 202 and include a frequency offset estimation circuit 2 (211a) to which IQ components (X_I' and X_Q') of an X polarized wave are input and another frequency offset estimation circuit 2 (211b) to which IQ components (Y_I' and Y_Q') of a Y polarized wave are input.

The frequency offset estimation circuits 1 and 2 (210 and 211) output estimation values 1 and 2 (each obtained by estimating a difference between an optical reception frequency and a frequency of the local oscillation light, the unit of the value being radian or cycle) to the decision circuit 212.

Each frequency offset estimation circuit 1 (210) estimates a frequency offset of a reception signal to be input to the adaptive equalization circuit 202 on one hand, and each frequency offset estimation circuit 2 (211) estimates a frequency offset based on a reception signal output from the adaptive equalization circuit 202 on the other hand. Accordingly, the frequency offset estimation circuit 1 (210) is a circuit that estimates a frequency offset that is a reference for the frequency offset estimation circuit 2 (211). For example, the frequency offset estimation circuit 1 (210) may decide whether a filter coefficient of the adaptive equalization circuit 202 is correct or incorrect based on the difference (displacement) of an estimation value 2 from an estimation value 1.

The frequency offset estimation circuit 1 (210) includes, for example, differentiation circuits that differentiate input signals, multiplication circuits that multiply IQ components, and an addition circuit that adds outputs of the multiplication circuits and so forth, and extracts a component of a frequency offset. The frequency offset estimation circuit 1 (210) may be configured using a technology disclosed, for example, in Z. Tao and five others, "Simple, Robust, and Wide-Range Frequency Offset Monitor for Automatic Frequency Control in Digital Coherent Receivers," 2007 33rd *European Conference and Exhibition on Optical Communication* (*ECOC*), 16-20, pp. 1-2, September 2007 or a like document.

Meanwhile, the frequency offset estimation circuit 2 (211) at the succeeding stage may estimate a frequency offset using the technology disclosed, for example, in Non-Patent Documents 2 and 3.

In this manner, in the embodiment 1, the frequency offset estimation circuits 1 and 2 (210 and 211) are provided at the preceding stage and the succeeding stage to the adaptive equalization circuit 202, respectively. With the configuration just described, a correct estimation value of the frequency offset may be output from the frequency offset estimation circuit 1 (210) at the preceding stage. Then, if the optimization control for a filter coefficient of the adaptive equalization circuit 202 is performed incorrectly, then an estimation value 2 of the frequency offset, which includes a difference from the estimation value 1 based on the incorrect filter coefficient by the adaptive equalization circuit 202, is output from the corresponding frequency offset estimation circuit 2 (211) at the succeeding stage.

Accordingly, the decision circuit 212 detects the difference between the estimation values 1 and 2 output from the frequency offset estimation circuits 1 and 2 (210 and 211). Thereupon, for the difference between the estimation values 1 and 2 of the X polarized waves, the decision circuit 212 uses the estimation values 1 and 2 output from the frequency offset estimation circuits 1 and 2 (210a and 211a). Similarly, for the difference between the estimation values 1 and 2 of the Y polarized waves, the decision circuit 212 uses the estimation values 1 and 2 output from the frequency offset estimation circuits 1 and 2 (210b and 211b).

Figure 3:
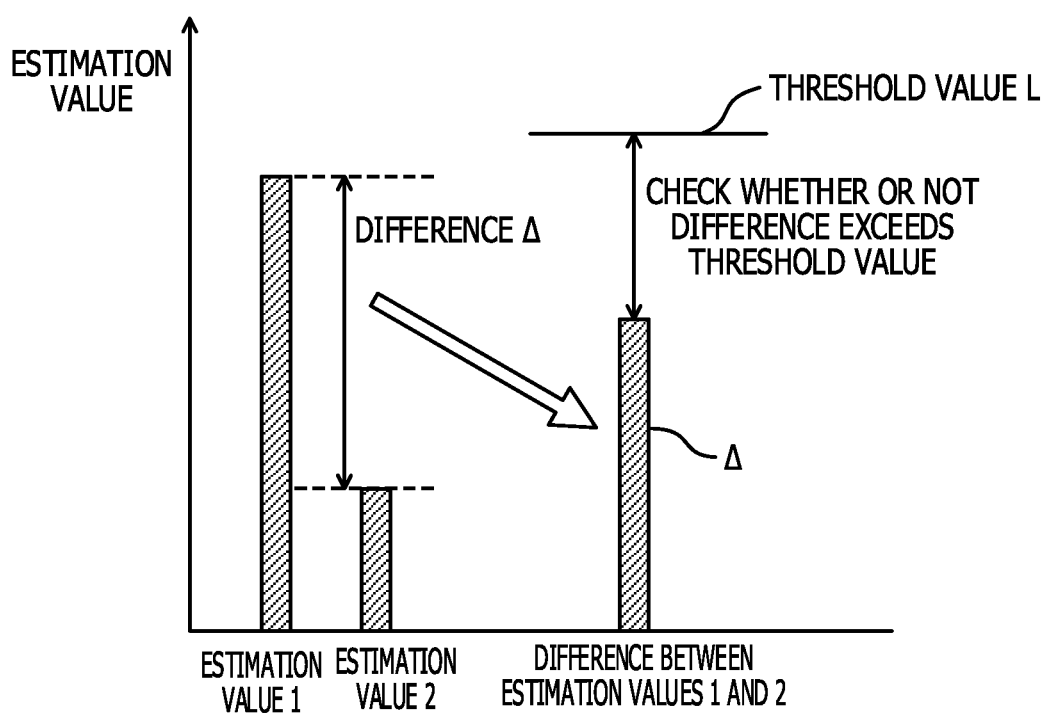
FIG. 3 is a diagram illustrating substance of a decision of a difference between estimation values by a decision circuit.

FIG. 3 is a diagram illustrating substance of a decision of a difference between estimation values by a decision circuit. The decision circuit may be the decision circuit 212 illustrated in FIG. 2. The decision circuit 212 provides a certain decision timing, at which the decision circuit 212 is to confirm once or a plural number of times whether or not the differences Δ between the estimation values 1 and 2 output from the frequency offset estimation circuits 1 and 2 (210 and 211) respectively exceed a given threshold value L. If the confirmation is performed by a plural number of times, then the likelihood of the decision can be improved and it becomes possible to protect the decision by the decision circuit 212 against an incorrect decision.

As illustrated in FIG. 3, the threshold value L is set to a value higher by more than a given value than a difference Δ between estimation values, that appears in ordinary operation. Thus, if the difference Δ between the estimation values 1 and 2 of the frequency offset exceeds the threshold value L, then the decision circuit 212 outputs a trigger for re-calculation of a correct filter coefficient to the adaptive equalization circuit 202.

Figure 4:
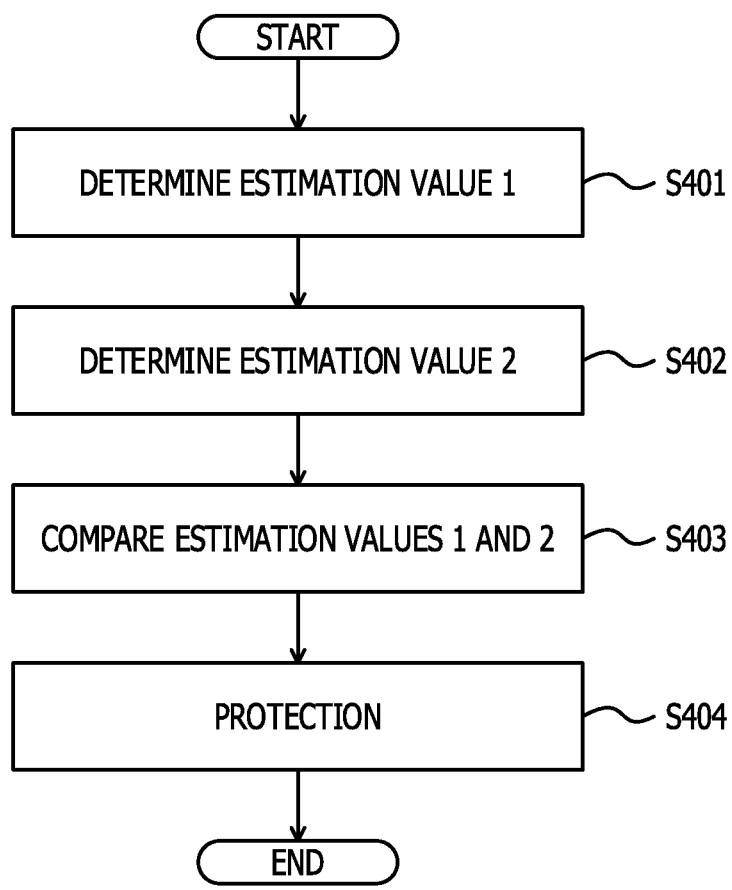
FIG. 4 is a flow chart illustrating an error detection process for optimization control of a filter coefficient according to the embodiment 1.

FIG. 4 is a flow chart illustrating an error detection process for optimization control of a filter coefficient according to the embodiment 1. First, each frequency offset estimation circuit 1 (210) may estimate a frequency offset of a reception signal to be input to the adaptive equalization circuit 202 to determine an estimation value 1 (operation S401).

Then, each frequency offset estimation circuit 2 (211) may estimate a frequency offset based on the reception signal output from the adaptive equalization circuit 202 to determine an estimation value 2 (operation S402).

Then, the decision circuit 212 may compare the estimation values 1 and 2 of the frequency offsets of the reception signals with each other (operation S403). Thereupon, the decision circuit 212 may compare, for the difference between the estimation values of the X polarized wave, the estimation values output from the frequency offset estimation circuits 1 and 2 (210a and 211a) with each other. Similarly, for the difference between the estimation values of the Y polarized wave, the decision circuit 212 may compare the estimation values output from the frequency offset estimation circuits 1 and 2 (210b and 211b) with each other.

Then, the decision circuit 212 may perform a protection process based on results of the comparison between the estimation values 1 and 2 (operation S404). For example, if each difference Δ between the estimation values 1 and 2 of the frequency offsets is equal to or lower than the threshold value L, then the decision circuit 212 may not output a trigger for re-calculation of a filter coefficient to the adaptive equalization circuit 202.

However, if the difference Δ between the estimation values 1 and 2 exceeds the threshold value L, then the decision circuit 212 may output a trigger for causing a correct filter coefficient to be re-calculated to the adaptive equalization circuit 202. For example, if the adaptive equalization circuit 202 performs adaptive equalization using an incorrect filter coefficient, then it is difficult to accurately perform compensation for polarization dispersion and so forth. In this case, the decision circuit 212 outputs a trigger for re-calculation to obtain a correct filter coefficient to the adaptive equalization circuit 202.

It is to be noted that the execution of the process at operation S404 may otherwise be performed after execution of the processes at operations S401 to S403 by a plural number of times. In this case, the decision circuit 212 confirms by the plural number of times whether or not the difference between the estimation values 1 and 2 exceeds the threshold value. Therefore, the likelihood of the decision may be improved, and the decision may be protected against a wrong decision by the decision circuit 212. In this manner, even where it is confirmed by a plural number of times whether or not the difference between the estimation values exceeds the threshold value, the confirmation is performed by internal processing of the reception unit 100 (signal processor 106). Therefore, a trigger may be output rapidly in comparison with a trigger outputting timing of the external reception signal processing circuit 110 of the reception unit 100.

With the embodiment 1, the decision circuit 212 detects the differences between the estimation values 1 and 2 of the frequency offset estimation circuits 1 and 2 (210 and 211) at the preceding stage and the succeeding stage to the adaptive equalization circuit 202 and detects an error in optimization control of the filter coefficient of the adaptive equalization circuit 202. The frequency offset estimation circuits 1 and 2 (210 and 211) and the decision circuit 212 are provided in the reception unit 100 (signal processor 106) and may rapidly output a trigger for causing a correct trigger coefficient to be re-calculated to the adaptive equalization circuit 202.

It may be provide the frequency offset estimation circuits 1 and 2 (210 and 211) at the preceding stage and the succeeding stage to the adaptive equalization circuit 202, and it may be decided rapidly whether a filter coefficient is correct or incorrect with a simple configuration. Only the frequency offset estimation circuits 1 and 2 (210 and 211) may be provided at the preceding stage and the succeeding stage to the adaptive equalization circuit 202.

For example, as described hereinabove in connection with the embodiment 1, where the decision circuit 212 is provided in the reception unit 100, a period of time for decision (detection for re-calculating a correct filter coefficient) is on the order of microseconds, for example. In contrast, for detection for re-calculation of a correct filter coefficient by the reception signal processing circuit 110 at the succeeding stage (for various signal processes such as synchronization and analysis of a frame and calculation of an error rate), time on the order of milliseconds may be required.

Accordingly, with the embodiment 1, even if changeover of a route takes place upon occurrence of a failure or in a like case, the adaptive equalization circuit 202 may rapidly perform, through quick outputting of a trigger, adaptive equalization using a correct filter coefficient suitable for compensation for a transmission characteristic (polarized wave and so forth). Further, the receiver (reception unit 100) may be started up rapidly using a correct filter coefficient and receive a reception signal properly.

While it is frequently requested to change over of a route upon occurrence of a failure within 50 ms, since the receiver (reception unit 100) may be started up quickly, the request for the route changeover may be satisfied to achieve normal reception of a reception signal. Further, the filter coefficient in operation of the receiver is controlled so as to follow up a dynamic variation (such as polarized wave rotation or PMD mentioned hereinabove) of the transmission line. Thereupon, even if the follow-up fails, the follow-up failure may be detected quickly and a trigger for changeover of the route may be applied early, and consequently, reduction of the changeover time may be anticipated.

In this manner, it is desired to perform the re-calculation of a filter coefficient by the adaptive equalization circuit 202 similarly also 1. upon starting up of the receiver (reception unit 100), 2. upon changeover of a route arising from a failure of the transmission line or the like, 3. upon follow-up to a dynamic variation of the transmission line and in some other cases. With the configuration described above, also upon occurrence of an event of any of 1 to 3 described above, the filter coefficient of the adaptive equalization circuit 202 may converge to a correct filter coefficient rapidly. Consequently, polarization demultiplexing and so forth by adaptive control may be performed normally to receive a reception signal rapidly and normally.

Embodiment 2

Figure 5:
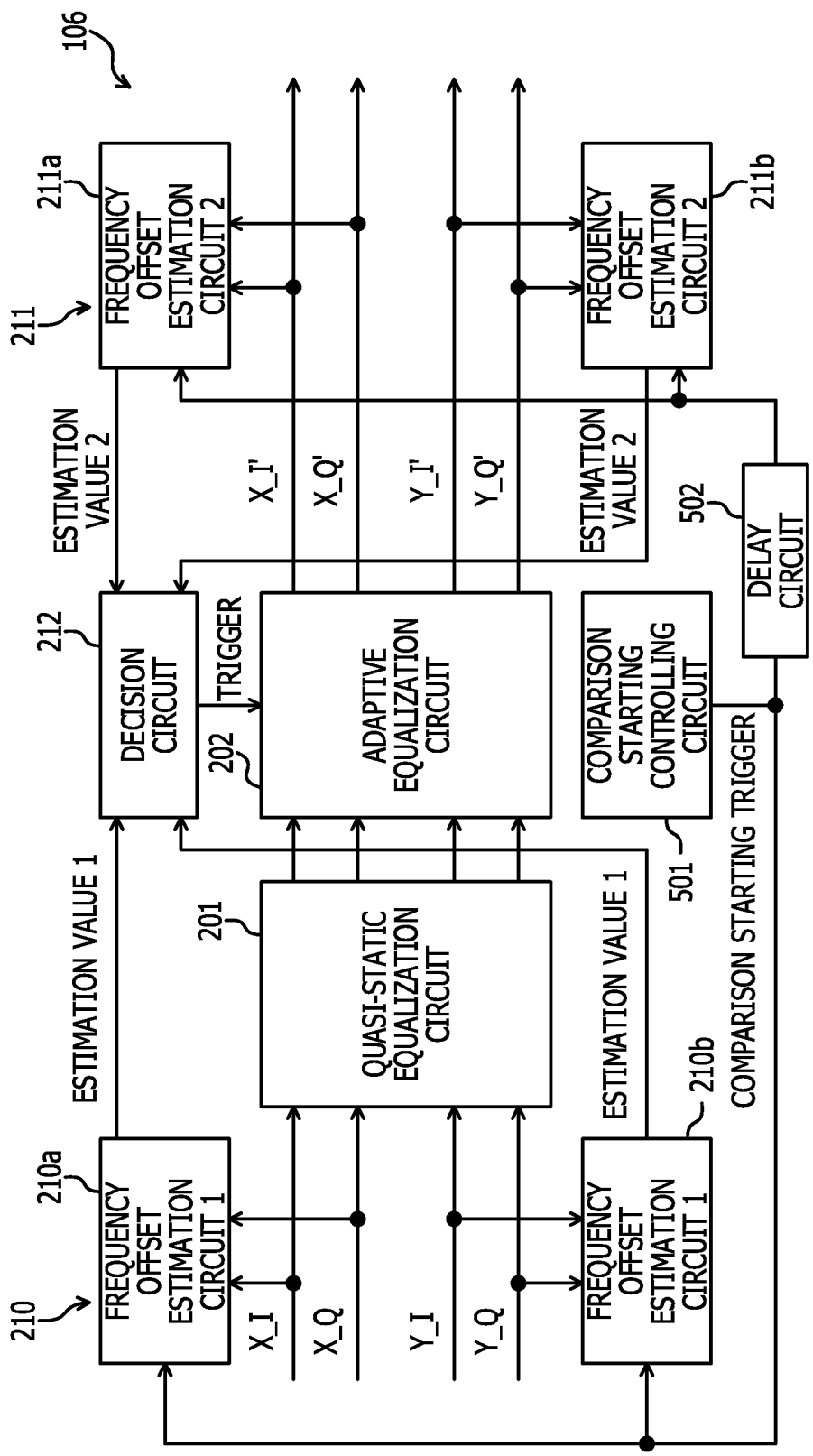
FIG. 5 is a block diagram depicting an internal configuration of a signal processor according to an embodiment 2.

FIG. 5 is a block diagram depicting an internal configuration of a signal processor according to an embodiment 2. Description is given of the signal processor 106 provided in the reception unit 100 depicted in FIG. 1. In FIG. 5, like elements to those of the embodiment 1 (FIG. 2) are denoted by the same reference characters.

In the description of the embodiment 2, an example of a circuit configuration that performs, by a plural number of times, decision of the difference between estimation values 1 and 2 by the decision circuit 212 at a given decision timing is described. The signal processor 106 depicted in FIG. 5 includes a comparison starting controlling circuit 501 and a delay circuit 502 in addition to the circuits depicted in FIG. 2.

The comparison starting controlling circuit 501 outputs a trigger for control to start comparison (comparison starting trigger) at a given timing to the frequency offset estimation circuits 1 and 2 (210 and 211). The outputting timings of a comparison starting trigger upon occurrence of events such as the above-described events, 1. starting up of the receiver (reception unit 100), 2. changeover of a route arising from a failure of the transmission line or the like, 3. follow-up to a dynamic variation of the transmission line and other cases are set to the comparison starting controlling circuit 501.

The delay circuit 502 delays the comparison starting trigger for the frequency offset estimation circuits 2 (211) provided at the succeeding stage to the adaptive equalization circuit 202 by a given delay time period.

Figure 6:
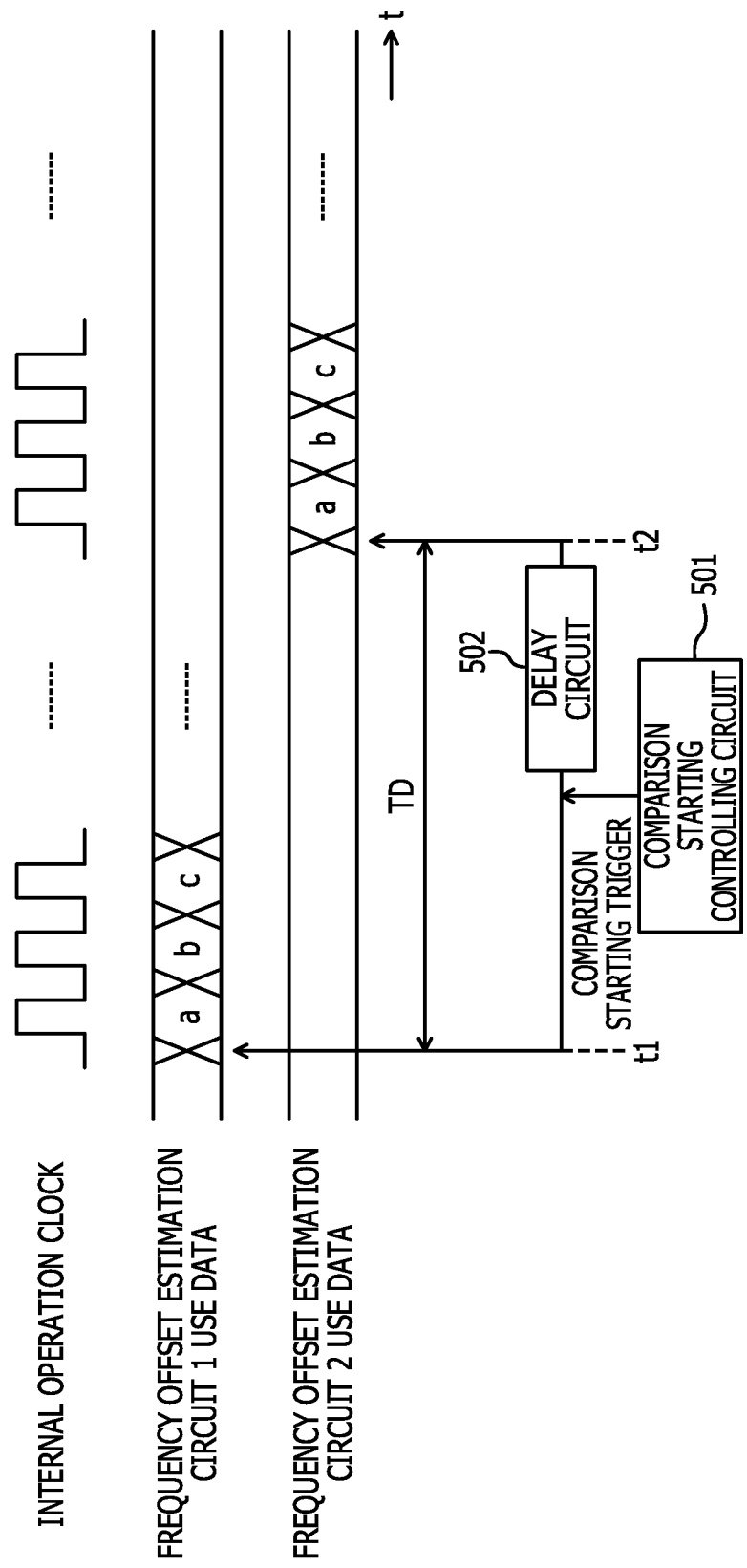
FIG. 6 is a timing chart illustrating operation timings of frequency offset estimation circuits.

FIG. 6 is a timing chart illustrating operation timings of frequency offset estimation circuits. The timing chart illustrated in FIG. 6 is a timing chart of the frequency offset estimation circuits 1 and 2 illustrated in FIG. 5. The frequency offset estimation circuits 1 and 2 (210 and 211) estimate estimation values for input reception signals a, b, c, . . . (IQ components X_I, X_Q, Y_I, Y_Q, X_I', X_Q', Y_I' and Y_Q' of the X and Y polarized waves) in synchronism with an internal operation clock of the signal processor 106.

Then, upon occurrence of each of the events 1 to 3 described hereinabove, the comparison starting controlling circuit 501 outputs a comparison starting trigger to the frequency offset estimation circuits 1 and 2 (210 and 211). In response to the comparison starting trigger, the frequency offset estimation circuits 1 (210) provided at the preceding stage to the adaptive equalization circuit 202 immediately start operation at time t1.

Here, the starting of the comparison operation for detecting a difference between the estimation values 1 and 2 by the decision circuit 212 is performed at a timing at which convergence of the (operation processing time) filter coefficient of the adaptive equalization circuit 202 is completed. This is because it is intended to obtain a normal estimation value by the frequency offset estimation circuits 2 (211) provided at the succeeding stage to the adaptive equalization circuit 202.

To this end, a circuit delay time period TD in which the reception signals a, b, c, . . . used in the frequency offset estimation circuits 1 (210) arrive at the frequency offset estimation circuits 2 (211) is calculated in advance. The circuit delay time period TD corresponds to a period of time required for the quasi-static equalization circuit 201 and the adaptive equalization circuit 202 of the signal processor 106 to perform signal processing for a reception signal.

Further, the delay circuit 502 is set or has a circuit configuration such that the comparison starting trigger is delayed by the circuit delay time period TD. By the setting or circuit configuration, each frequency offset estimation circuit 2 (211) starts operation at time t2 delayed by the circuit delay time period TD from the timing of the comparison starting trigger output from the comparison starting controlling circuit 501.

Consequently, the frequency offset estimation circuits 1 and 2 (210 and 211) may calculate the estimation values 1 and 2 for the same reception signals a, b, c, . . . , and comparison between the estimation values 1 and 2 may be performed by the decision circuit 212.

Also in the embodiment 2, a decision process of a difference between estimation values by the decision circuit is performed similarly as in the embodiment 1 (refer to FIG. 4). Thereupon, in accordance with an outputting timing (time t1) of the comparison starting trigger by the comparison starting controlling circuit 501, each frequency offset estimation circuit 1 (210) calculates the estimation value 1 for the reception signals a, b, c, . . . (operation S401). Thereafter, at a timing (time t2) at which the circuit delay time TD of the comparison starting trigger elapses, each frequency offset estimation circuit 2 (211) calculates the estimation value 2 for substantially the same reception signals a, b, c, . . . (operation S402). Consequently, the decision circuit 212 may perform comparison between the estimation values 1 and 2 of the frequency offsets estimated based on substantially the same reception signals a, b, c, . . . .

Then, after the processes at operations S401 to S403 are executed by a plural number of times, a protection process (operation S404) may be executed. In this case, the comparison starting controlling circuit 501 outputs the comparison starting trigger by a plural number of times, and a difference between the estimation values at the plural number of times is calculated at operation S403. Consequently, the decision circuit 212 confirms by a plural number of times whether or not the difference between the estimation values 1 and 2 calculated at different timings for substantially the same reception signals a, b, c, . . . exceeds the threshold value. Therefore, the likelihood of decision may be improved, and the decision may be protected against an incorrect decision by the decision circuit 212.

Further, even where the comparison starting trigger is output by a plural number of times, the outputting process may be performed by internal processing of the reception unit 100 (signal processor 106). Therefore, rapid trigger outputting can be anticipated in comparison with the trigger outputting timing of the external reception signal processing circuit 110 of the reception unit 100.

With the embodiment 2, the frequency offset estimation circuits 1 and 2 (210 and 211) provided at the preceding stage and the succeeding stage to the adaptive equalization circuit 202 calculate an estimation value of a frequency offset for substantially the same reception signals a, b, c, . . . taking the operation processing time of the adaptive equalization circuit 202 into consideration. In addition to the effects of the embodiment 1, since the decision circuit 212 may compare the estimation values 1 and 2 of the frequency offsets estimated based on substantially the same reception signals a, b, c, . . . , the embodiment 2 may further improve the decision accuracy.

Embodiment 3

Figure 7:
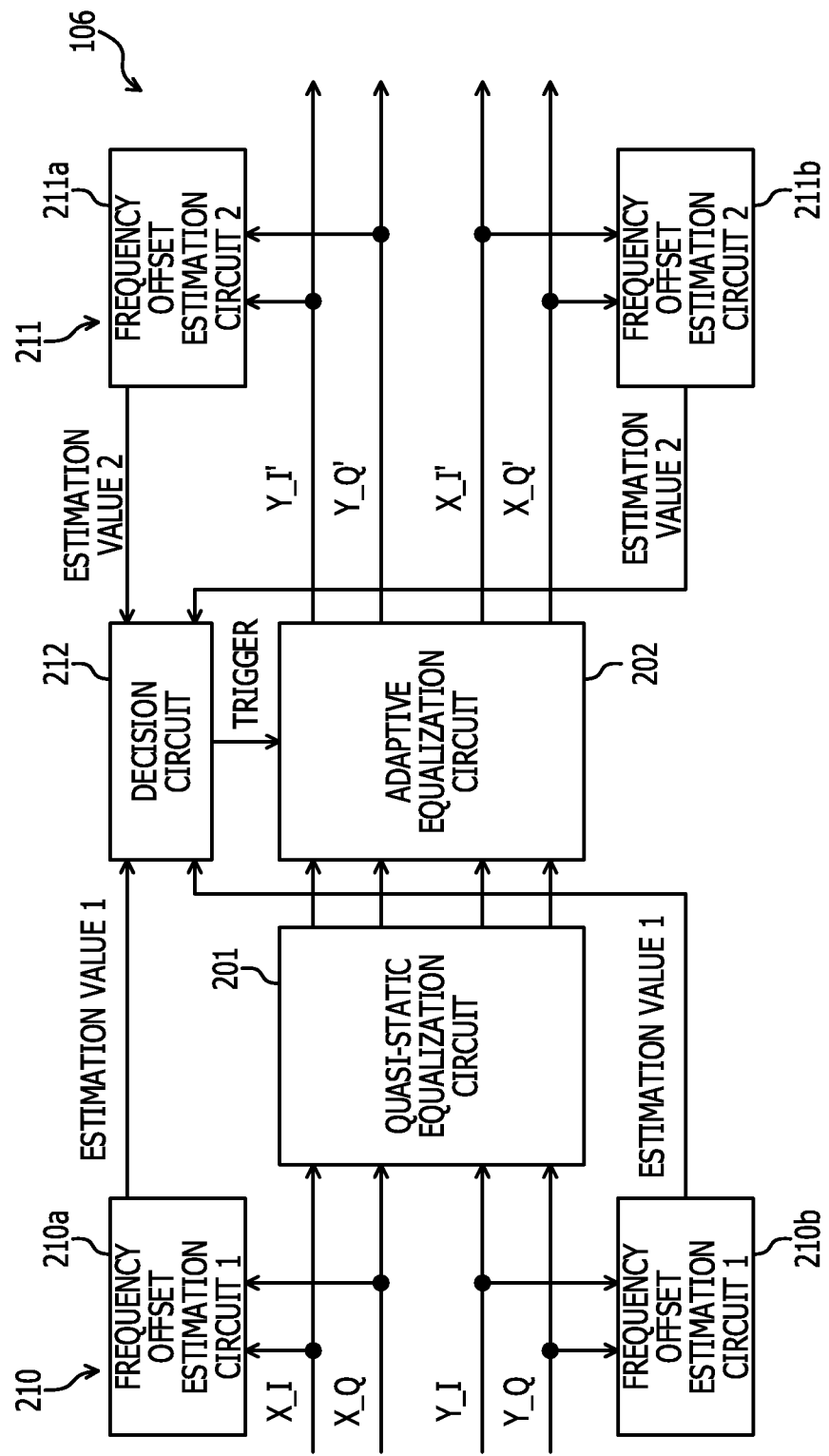
FIG. 7 is a block diagram depicting an internal configuration of a signal processor according to an embodiment 3.

FIG. 7 is a block diagram depicting an internal configuration of a signal processor according to an embodiment 3. Description is given of the signal processor 106 provided in the reception unit 100 depicted in FIG. 1. In FIG. 7, like elements to those of the embodiment 1 (FIG. 2) are denoted by the same reference characters.

In the description of the embodiment 3, description is given of an example of a configuration that decides an estimation value in response to output reversal of X and Y polarized waves of the adaptive equalization circuit 202. The adaptive equalization circuit 202 outputs, as outputs after adaptive equalization, an X polarized wave and a Y polarized wave from an X port and a Y port, respectively, as described in the description of the embodiment 1 (FIG. 2) and so forth. However, the adaptive equalization circuit 202 may output X polarized waves (X_I' and X_Q') from Y ports and output Y polarized waves (Y_I' and Y_Q') from X ports as depicted in FIG. 7.

In order to cope with the output reversal, the decision circuit 212 selects the most likely estimation value from between the estimation values 2 of the two frequency offset estimation circuits 2 (211a and 211b), which are a target of comparison with the estimation values of the frequency offset estimation circuits 1 in which the reception signals of X polarized waves are used.

In the present embodiment 3, at the preceding stage to the adaptive equalization circuit 202, the frequency offset estimation circuit 1 (210a) for an X polarized wave or the frequency offset estimation circuit 1 (210b) for a Y polarized wave may be provided. The configuration just described may reduce the number of frequency offset estimation circuits 1 (210) to one half to achieve further configuration simplification.

Figure 8:
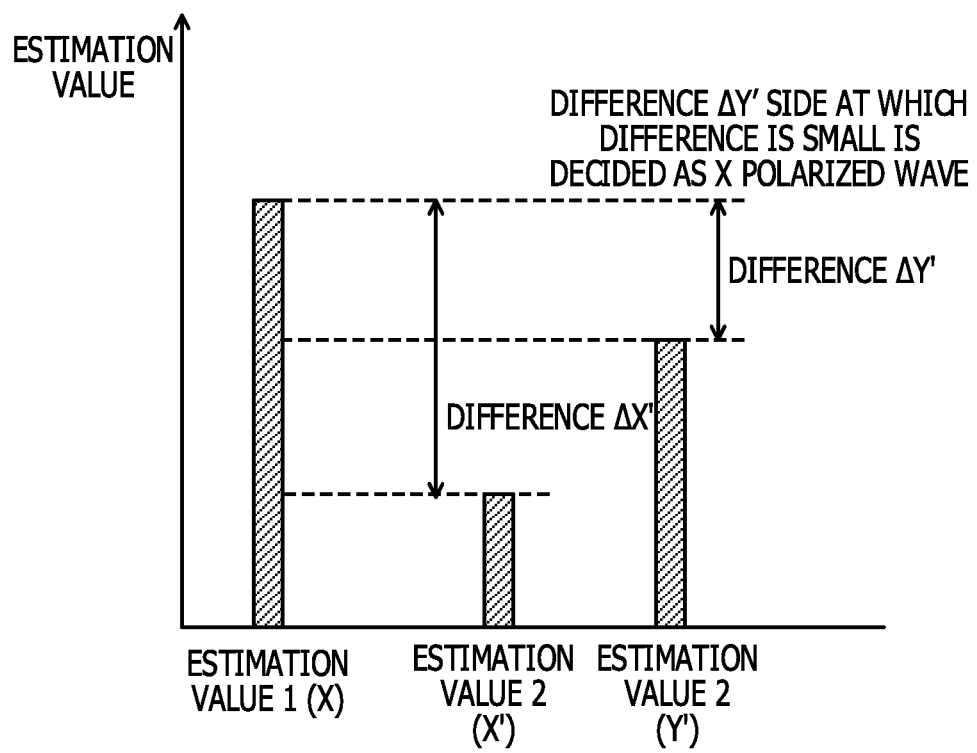
FIG. 8 is a diagram illustrating a decision of the most likely estimation value by a decision circuit.

FIG. 8 is a diagram illustrating a decision of the most likely estimation value by a decision circuit. The decision illustrated in FIG. 8 may be performed by the decision circuit 212 illustrated in FIG. 7. The likelihood is decided with "lowness of an absolute value of the difference between estimation values" of the frequency offsets. In the example of FIG. 8, the estimation value 2 that has an absolute value of a difference smaller than an absolute value of the estimation value 1 of the reception signal of the X polarized wave is an output of the frequency offset estimation circuit 2 (211a) for the Y' polarized wave. Therefore, the decision circuit 212 decides that the estimation value 2 output from the frequency offset estimation circuit 2 (211b) for the Y' polarized wave is an X polarized wave, and selects the estimation value 2.

Then, the decision circuit 212 compares the estimation value 1 of the frequency offset estimation circuit 1 (210b) in which data of a Y polarized wave is used with the estimation value 2 outputted from the other frequency offset estimation circuit 2 (211a) that has not been selected on the basis of the "lowness of an absolute value of the difference between estimation values".

With the embodiment 3, even if output reversal of X and Y polarized waves of the adaptive equalization circuit 202 occurs, comparison using the estimation values 1 and 2 for the same X and Y polarized waves may be performed with regard to the frequency offset estimation circuits 1 and 2. Consequently, the embodiment 3 may achieve further improvement in decision accuracy by the decision circuit 212 in addition to the effects of the embodiment 1.

Embodiment 4

Figure 9:
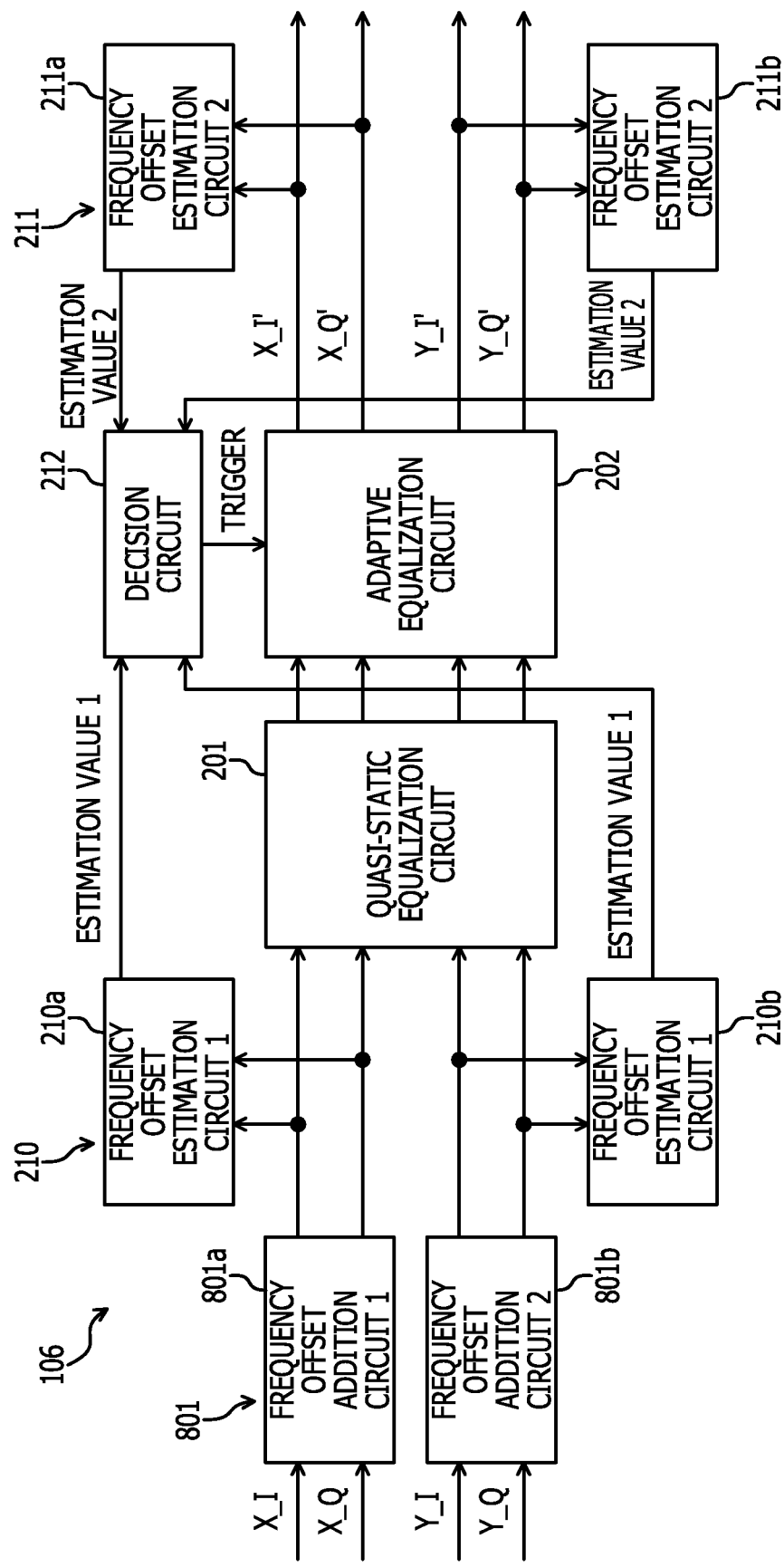
FIG. 9 is a block diagram depicting an internal configuration of a signal processor according to an embodiment 4.

FIG. 9 is a block diagram depicting an internal configuration of a signal processor according to an embodiment 4. Description is given of the signal processor 106 provided in the reception unit 100 depicted in FIG. 1. In FIG. 9, like elements to those of the embodiment 1 (FIG. 2) are denoted by the same reference characters.

In the embodiment 4, a frequency offset addition circuit 801 is provided at an input stage of the signal processor 106. The frequency offset addition circuit 801 includes a frequency offset addition circuit 1 (801a) that adds a given frequency offset to an X polarized wave, and another frequency offset addition circuit 2 (801b) that adds a given frequency offset to a Y polarized wave.

Figure 10:
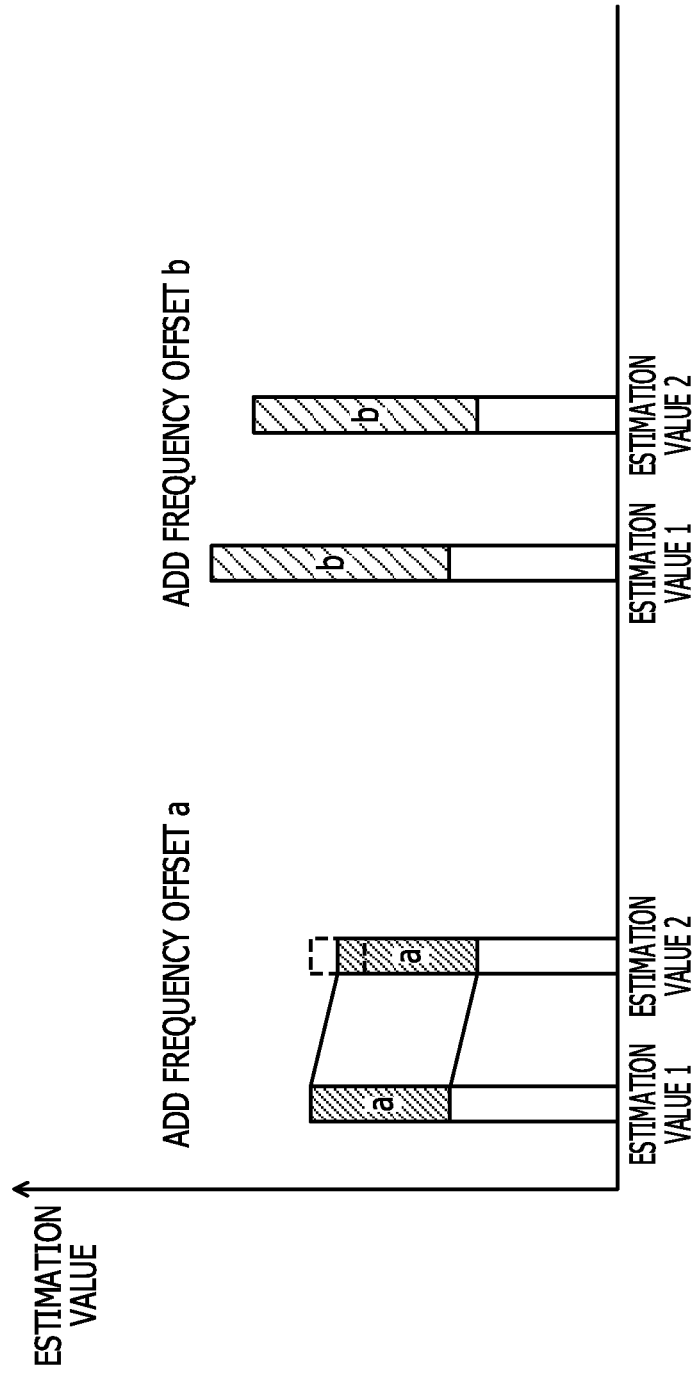
FIG. 10 is a diagram illustrating a variation state of estimation values based on a variation of a frequency offset.

FIG. 10 is a diagram illustrating a variation state of estimation values based on a variation of a frequency offset. The estimation values illustrated in FIG. 10 may be the estimation values 1 and 2 illustrated in FIG. 9. It can be assumed that, if the frequency offset to be added to a reception signal is varied by the frequency offset addition circuit 801, then variation amounts appear as an equal variation amount in the estimation values 1 and 2 of the frequency offset estimation circuits 1 and 2.

FIG. 10 illustrates a state in which a given frequency offset a is added to the estimation values 1 and 2 of the frequency offset estimation circuits 1 and 2 by the frequency offset addition circuit 801. Thereupon, it is assumed that the variation amounts of the estimation values 1 and 2 of the frequency offset estimation circuits 1 and 2 (210 and 211) when the frequency offset a is added are substantially equal to each other as indicated by solid lines in FIG. 10. In this case, the decision circuit 212 decides that the filter coefficient of the adaptive equalization circuit 202 is correct.

However, it is assumed that, when the frequency offset a is added, the variation amount of the estimation value 2 of the frequency offset estimation circuit 2 (211) changes to a' (the estimation value increases or decreases conversely as indicated by a broken line in FIG. 10) and consequently the variation amounts of the estimation value 1 and the estimation value 2 become different from each other. In this case, the decision circuit 212 decides that the filter coefficient of the adaptive equalization circuit 202 is incorrect. Then, the decision circuit 212 outputs a trigger for re-calculation of a filter coefficient to the adaptive equalization circuit 202.

Also when a given frequency offset b is added at a different timing by the frequency offset addition circuit 801, it is decided similarly that, when the variation amounts of the estimation value 1 and the estimation value 2 are different from each other, the filter coefficient of the adaptive equalization circuit 202 is incorrect.

Figure 11:
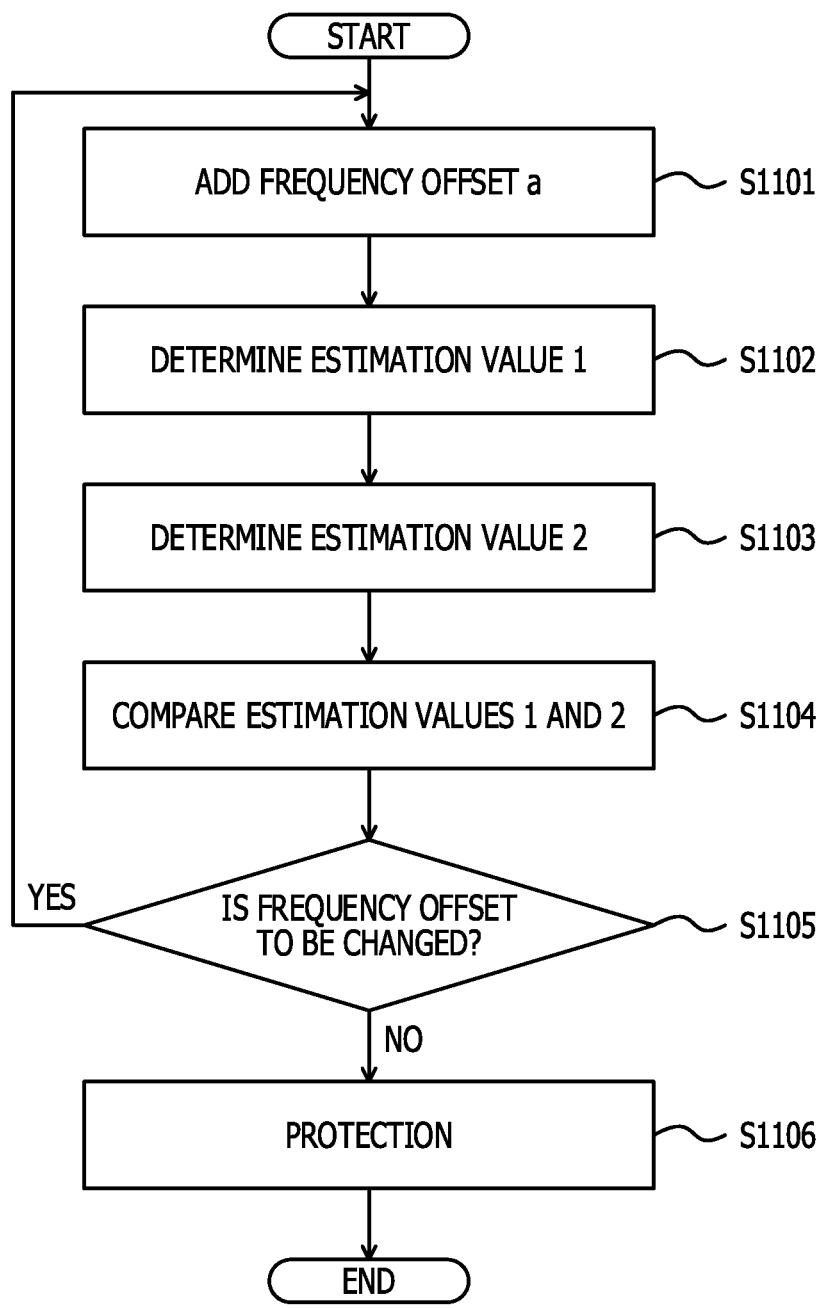
FIG. 11 is a flow chart illustrating an error detection process of optimization control of a filter coefficient according to the embodiment 4.

FIG. 11 is a flow chart illustrating an error detection process of optimization control of a filter coefficient according to the embodiment 4. Description is given of an example of processing for changing a frequency offset and deciding whether a filter coefficient of the adaptive equalization circuit 202 is correct or incorrect based on detection of variation amounts of the estimation value 1 and the estimation value 2 over a plural number of times.

First, a frequency offset (for example, a frequency offset a depicted as an initial value in FIG. 10) may be added to a reception signal by each of the frequency offset addition circuits 1 and 2 (801) (operation S1101).

Then, each frequency offset estimation circuit 1 (210) may estimate a frequency offset with regard to the reception signal including the added frequency offset a and to be input to the adaptive equalization circuit 202 to determine an estimation value 1 (operation S1102).

Then, each frequency offset estimation circuit 2 (211) may estimate a frequency offset based on the reception signal including the added frequency offset a and output from the adaptive equalization circuit 202 to determine an estimation value 2 (operation S1103).

Then, the decision circuit 212 may compare the estimation values 1 and 2 of the frequency offsets of the reception signals including the added frequency offset a with each other (operation S1104).

Thereafter, the decision circuit 212 may decide whether or not a different frequency offset b is added to the reception signal by the frequency offset estimation circuits 1 and 2 (801) (operation S1105). The processing for the decision just described may be performed by the decision circuit 212, by a controller that entirely controls the signal processor 106 including the frequency offset estimation circuits 1 and 2 (801), by the comparison starting controlling circuit 501 (refer to FIG. 5) or by some other circuit.

For example, where the two frequency offsets a and b are to be added to the reception signal, the processing returns from operation S1105 to operation S1101 in order to change the frequency offset a to be added (operation S1105: Yes). Then, the frequency offset estimation circuits 1 and 2 (801) may change the frequency offset to be added from the frequency offset a to the frequency offset b. Then, the processes at operations S1102 to S1104 are executed, and since the frequency offset to be added is the frequency offset b at operation S1105, the processing advances to operation S1106 without performing change of the frequency offset b to be added (operation S1105: No).

At operation S1106, the decision circuit 212 may perform a protection process based on a result of comparison between the estimation values 1 and 2. The protection process may be substantially the same as the protection process in the embodiment 1 (operation S404 of FIG. 4), and the decision circuit 212 may compare a difference Δ between the estimation values 1 and 2 of the frequency offsets with a threshold value L to determine whether or not a trigger for re-calculation of the filter coefficient is to be output to the adaptive equalization circuit 202.

In the embodiment 4, the two frequency offsets a and b are added to a reception signal as described above. Therefore, in the process at operation S1106, it is further decided that the filter coefficient of the adaptive equalization circuit 202 is incorrect if, as a result of comparison of the estimation values at operation S1104, the variation amounts of the estimation values 1 and 2 are different from each other in both cases in which the added frequency offset is a and b.

In this manner, in the decision, for example, by the decision circuit 212, the difference between the estimation values 1 and 2 is confirmed using a threshold value and a difference between variation amounts of the estimation values 1 and 2 when the frequency offset to be added to a reception signal is changed. Therefore, the likelihood of the decision may be further improved and the result of the decision may be protected against an incorrect decision by the decision circuit 212.

Although, in order to simplify the description, it is described in the description of the above-described process that the two frequency offsets a and b are added to a reception signal, the number of frequency offsets may be increased to n (3 or more). Further, even if the number of frequency offsets to be added to a reception signal is increased to n, the increase of the number of frequency offsets may be coped with by processing in the reception unit 100 (signal processor 106). Therefore, a trigger may be output more rapidly with respect to the trigger outputting timing of the external reception signal processing circuit 110 of the reception unit 100.

With the embodiment 4, when the frequency offset to be added to a reception signal is changed by the frequency offset addition circuit 801, the decision circuit 212 detects whether or not the variation amount appears as a substantially equal variation amount on the estimation amounts 1 and 2 of the frequency offset estimation circuits 1 and 2. By adding the frequency offset by a given amount in the receiver (reception unit 100) in this manner, it may be decided simply whether the filter coefficient of the adaptive equalization circuit 202 is correct or incorrect.

Further, as the frequency offset estimation circuits 1 (210) that perform offset estimation using a main signal before inputting to the adaptive equalization circuit 202 described in connection with the embodiments 1 to 4 described above, a technology of Tadao Nakagawa and six others, "Wide-Range and Fast-Tracking Frequency Offset Estimator for Optical Coherent Receivers," *European Conference on Optical Communications* 2010, 19-23 Sep., 2010, Trino, Italy, We. 7. A. 2 may be applied. The frequency offset estimation circuits 1 (210) according to the technology just described are divergently coupled to a preceding stage to the input to the adaptive equalization circuit 202 depicted in FIG. 2 (to a succeeding stage to the quasi-static equalization circuit 201). Consequently, similarly as in the embodiments 1 to 4 described above, the frequency offset estimation values at the preceding and succeeding stages to the adaptive equalization circuit 202 may be compared with each other and an error in convergence of the optimization control of the filter coefficient can be decided.

As described so far, with the embodiments, whether convergence of the filter coefficient of the adaptive equalization circuit is correct or incorrect may be decided with a simple configuration that estimation values of the offset estimation circuit provided at the preceding and succeeding stages to the adaptive equalization circuit are simply compared with each other by the decision circuit. Since the offset estimation circuit and the decision circuit are provided in the reception unit in which the adaptive equalization circuit is provided, when it is decided by the decision circuit that the filter coefficient is incorrect, a trigger for re-calculation of a correct filter coefficient may be quickly applied to the adaptive equalization circuit.

Consequently, in such a case that the route of the transmission line is changed over because of occurrence of a failure or in a like case, polarization demultiplexing and so forth to be performed by the adaptive equalization circuit may be performed in short time to start up the receiver, and it becomes possible quickly to correctly receive the reception signal. Further, it becomes possible to start up the receiver in a period of required time (for example, within 50 ms) for the changeover of the route, and the reception signal may be compensated for and received correctly.

Further, while the filter coefficient upon operation of the receiver follows up a dynamic variation of the transmission line, polarization demultiplexing and so forth may be performed quickly similarly also in a case in which the follow-up fails.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical receiver, comprising:
a signal processor configured to perform digital signal processing on a polarization demultiplexed signal which is obtained by demultiplexing a polarization multiplexed signal corresponding to a reception signal,
the signal processor includes:
an adaptive equalization circuit configured to compensate for the polarization demultiplexed signal by control of a filter coefficient;
a first frequency offset estimation circuit configured to receive a first polarization demultiplexed signal which is diverged at a preceding stage to the adaptive equalization circuit and estimate a first frequency offset of the first polarization demultiplexed signal for each of polarized waves;
a second frequency offset estimation circuit to receive a second polarization demultiplexed signal diverged at a succeeding stage to the adaptive equalization circuit and estimate a second frequency offset of the second polarization demultiplexed signal for each of the polarized waves; and a decision circuit to decide whether the filter coefficient is correct based on a first difference between the first frequency offset and the second frequency offset and output, when the decision circuit decides that the filter coefficient is incorrect, a first trigger for re-calculation of the filter coefficient to the adaptive equalization circuit.

2. The optical receiver according to claim 1, further comprising:

a control circuit configured to output second triggers for starting operation of the first frequency offset estimation circuit and the second frequency offset estimation circuit respectively; and a delay circuit configured to delay the second trigger for the second frequency offset estimation circuit by a time period for a signal processing by the adaptive equalization circuit.

3. The optical receiver according to claim 1, wherein the decision circuit corresponds to reversal of polarized wave outputs of the adaptive equalization circuit to select, as an estimation value for one of the polarized waves, an estimation value having a smaller difference from among a difference between the second frequency offset for the one of the polarized waves and the first frequency offset for the one of the polarized waves and a difference between the second frequency offset for the other one of the polarized waves and the first frequency offset for the one of the polarized waves.

4. The optical receiver according to claim 3, wherein the decision circuit selects a non-selected estimation value as the estimation value for the other one of the polarized waves.

5. The optical receiver according to claim 3, wherein the first frequency offset estimation circuit outputs, as the first frequency offset, a first estimation value on the side of the one of the polarized waves based on the first polarization demultiplexed signal on the side of the one of the polarized waves.

6. The optical receiver according to claim 1, further comprising:

a frequency offset addition circuit, provided at a preceding stage to the first frequency offset estimation circuit, configured to add a given frequency offset to the polarization demultiplexed signal, wherein the decision circuit deciding whether the filter coefficient is correct based on a second difference between an added first frequency offset and an added second frequency offset when the given frequency offset is added by the frequency offset addition circuit.

7. The optical receiver according to claim 6, wherein the frequency offset addition circuit adds a different frequency offset at each of a plurality of timings; and the decision circuit calculates, at each of the plurality of timings, the second difference and decides, when the second difference differs at least one of the plurality of timings, that the filter coefficient is incorrect.

8. The optical receiver according to claim 1, wherein the reception signal includes an X-polarized wave and a Y-polarized wave which are multiplexed with each other;

each of the first frequency offset estimation circuit and the second frequency offset estimation circuit has a first circuit for the X-polarized wave and a second circuit for the Y-polarized wave; and the decision circuit compares estimation values of the X-polarized waves with each other and compares estimation values of the Y-polarized waves with each other.

9. The optical receiver according to claim 1, wherein the decision circuit compares the first difference with a given threshold value, and the decision circuit decides, when the difference exceeds the threshold value, that the filter coefficient is incorrect.

10. An optical receiving method comprising:

compensating, by control of a filter coefficient of an adaptive equalization circuit, for a polarization demultiplexed signal which is obtained by demultiplexing a polarization multiplexed signal corresponding to a reception signal;

estimating a first frequency offset for each of polarized waves from a first divergent input of the reception signal at a preceding stage to the adaptive equalization circuit;

estimating a second frequency offset for each of the polarized waves from a second divergent input of the reception signal at a succeeding stage to the adaptive equalization circuit; and deciding whether the filter coefficient is correct based on a first difference between the first frequency offset and the second frequency offset; and outputting, when deciding the filter coefficient is incorrect, a first trigger for re-calculation of the filter coefficient to the adaptive equalization circuit.

11. The optical receiving method according to claim 10, further comprising:

outputting second triggers for starting estimation of the first frequency offset and the second frequency offset; and delaying the second trigger for the estimation of the second frequency offset by a time period for a signal processing by the adaptive equalization circuit.

12. The optical receiving method according to claim 10, further comprising:

selecting, as an estimation value for one of the polarized waves, an estimation value having a smaller difference from among a difference between the second frequency offset for the one of the polarized waves and the first frequency offset for the one of the polarized waves and a difference between the second frequency offset for the other one of the polarized waves and the first frequency offset for the one of the polarized waves.

13. The optical receiving method according to claim 10, further comprising:

selecting a non-selected estimation value as the estimation value for the other one of the polarized waves.

14. The optical receiving method according to claim 10, further comprising:

adding a given frequency offset to the polarization demultiplexed signal; and deciding whether the filter coefficient is correct based on a second difference between an added first frequency offset and an added second frequency offset when the given frequency offset is added.

15. The optical receiving method according to claim 14, further comprising:

adding a different frequency offset at each of a plurality of timings; and calculating, at each of the plurality of timings, the second difference; and deciding, when the second difference differs at least one of the plurality of timings, that the filter coefficient is incorrect.

16. The optical receiving method according to claim 10, wherein
    the reception signal includes an X-polarized wave and a Y-polarized wave which are multiplexed with each other;
    estimation values of the X-polarized waves are compared with each other and estimation values of the Y-polarized waves are compared with each other.

17. The optical receiving method according to claim 10, further comprising:
    comparing the first difference with a given threshold value; and
    deciding, when the difference exceeds the threshold value, that the filter coefficient is incorrect.

* * * * *